United States Patent
Liao

[19]

[11] Patent Number: 5,888,159
[45] Date of Patent: Mar. 30, 1999

[54] CHAIN ADJUSTER FOR BICYCLES

[76] Inventor: H. C. Liao, 6F-6, 186, Section 1, Wen Hsin Rd., Taichung, Taiwan

[21] Appl. No.: 861,149

[22] Filed: May 21, 1997

[51] Int. Cl.$^6$ ...................................................... F16H 7/14
[52] U.S. Cl. ............................................ 474/116; 474/101
[58] Field of Search ................................... 474/101, 113, 474/116, 118, 136

[56] References Cited

U.S. PATENT DOCUMENTS

| | | | |
|---|---|---|---|
| 139,228 | 5/1873 | Arnold | 474/136 |
| 263,399 | 8/1882 | Gardener | 474/136 |
| 570,327 | 10/1896 | Naregang | 474/116 |
| 609,062 | 8/1898 | Webb | 474/116 |
| 628,082 | 7/1899 | Ennis et al. | 474/116 |
| 1,001,972 | 8/1911 | Mckellar | 474/116 |
| 1,269,034 | 6/1918 | Woodworth | 474/116 |
| 2,475,806 | 7/1949 | Simpson | 474/116 |

FOREIGN PATENT DOCUMENTS

| | | | |
|---|---|---|---|
| 2.1125 | 3/1922 | France | 474/116 |
| 1040856 | 10/1953 | France | 474/116 |

*Primary Examiner*—Rodney H. Bonck
*Assistant Examiner*—Ankur Parekh

[57] ABSTRACT

A chain adjuster for bicycles includes a body having one of two sides thereof a dovetail groove and a hole defined laterally therethrough for an axle of rear hub extending therethrough, a tubular member extending laterally therefrom, a first block slidably received in the dovetail groove, a second block fixedly connected to one of two ends of the body and an adjusting bolt threadedly extending through the second block to contact the first block. The first block is pushed by the adjusting bolt to push the bicycle's rear fork tip so as to adjust a tension of the chain.

2 Claims, 6 Drawing Sheets

CHAIN ADJUSTER FOR BICYCLES

BACKGROUND OF THE INVENTION

1. Field of the Invention

The present invention relates to a chain adjuster and, more particularly, to an improved chain adjuster for bicycles and which uses only one bolt to push a block slidably received in the chain adjuster.

2. Brief Description of the Prior Art

FIGS. 1 and 2 show a conventional chain adjuster which is a longitudinal plate having a first end with a hole 2 defined laterally therethrough and a second end having an end wall 8 extending laterally therefrom. The end wall 8 has two threaded holes 6 defined therethrough for two bolts 7 respectively engaged therein. An axle 3 of the rear hub extends through the hole 2 and is positioned by a nut and the two bolts 7 extending through the threaded holes 6 contact the rear fork tip 4 so that when the chain 5 is adjusted, the two bolts 7 is threadedly to push the rear fork tip 4 respectively. However, it is difficult to control the two bolts 7 to be moved with the same distance so that each of the bolts 7 could exert two respective forces with different values to the rear fork tip 4. Furthermore, a user has to operate the two bolts 7 respectively and it takes time.

The present invention intends to provide an improved chain adjuster to mitigate and/or obviate the above-mentioned problems.

SUMMARY OF THE INVENTION

The present invention provides a chain adjuster for bicycles and comprises a body a first side and a second side which has a groove defined longitudinally therein, a hole defined in the body and a tubular member extending laterally from the second side of the body. The body has two first threaded holes defined laterally in one of two ends thereof.

A first block has a first protrusion so as to be slidably received in the groove. A second block has a second protrusion so that the second protrusion is received in the groove. The second block has a second threaded hole defined transversely therethrough and two third threaded holes defined laterally opposite to the second protrusion so that the second block is fixedly disposed to the body by threadedly extending two bolts through the third threaded holes and being received in the first threaded holes.

An adjusting bolt threadedly extends through the second threaded hole and contacts the first block.

It is an object of the present invention to provide a chain adjuster using only one adjusting bolt.

It is another object of the present invention to provide a chain adjuster having a first block slidably connected thereto so as to be pushed by the adjusting bolt.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
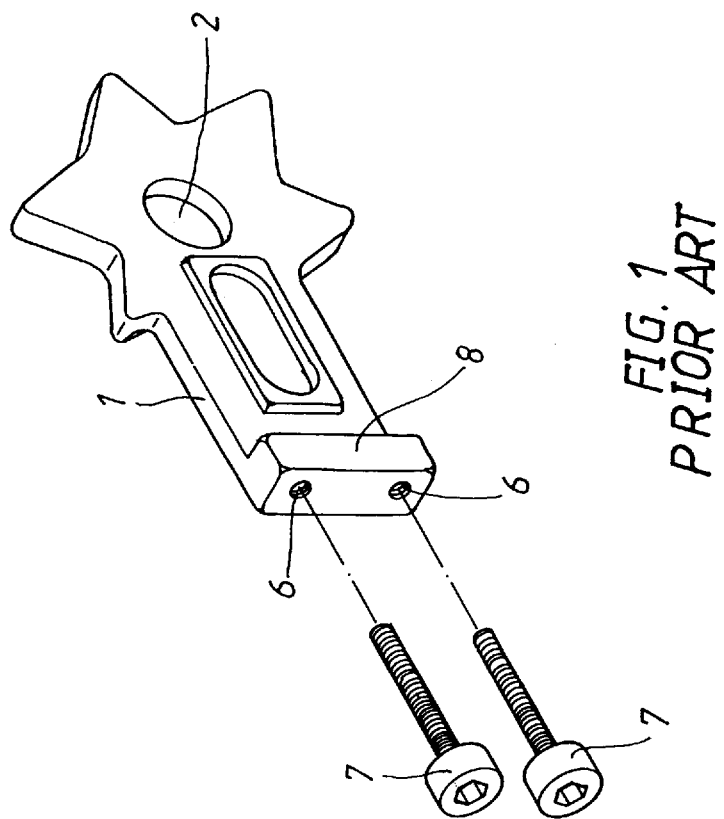
FIG. 1 is an exploded view of a conventional chain adjuster.
Figure 2:
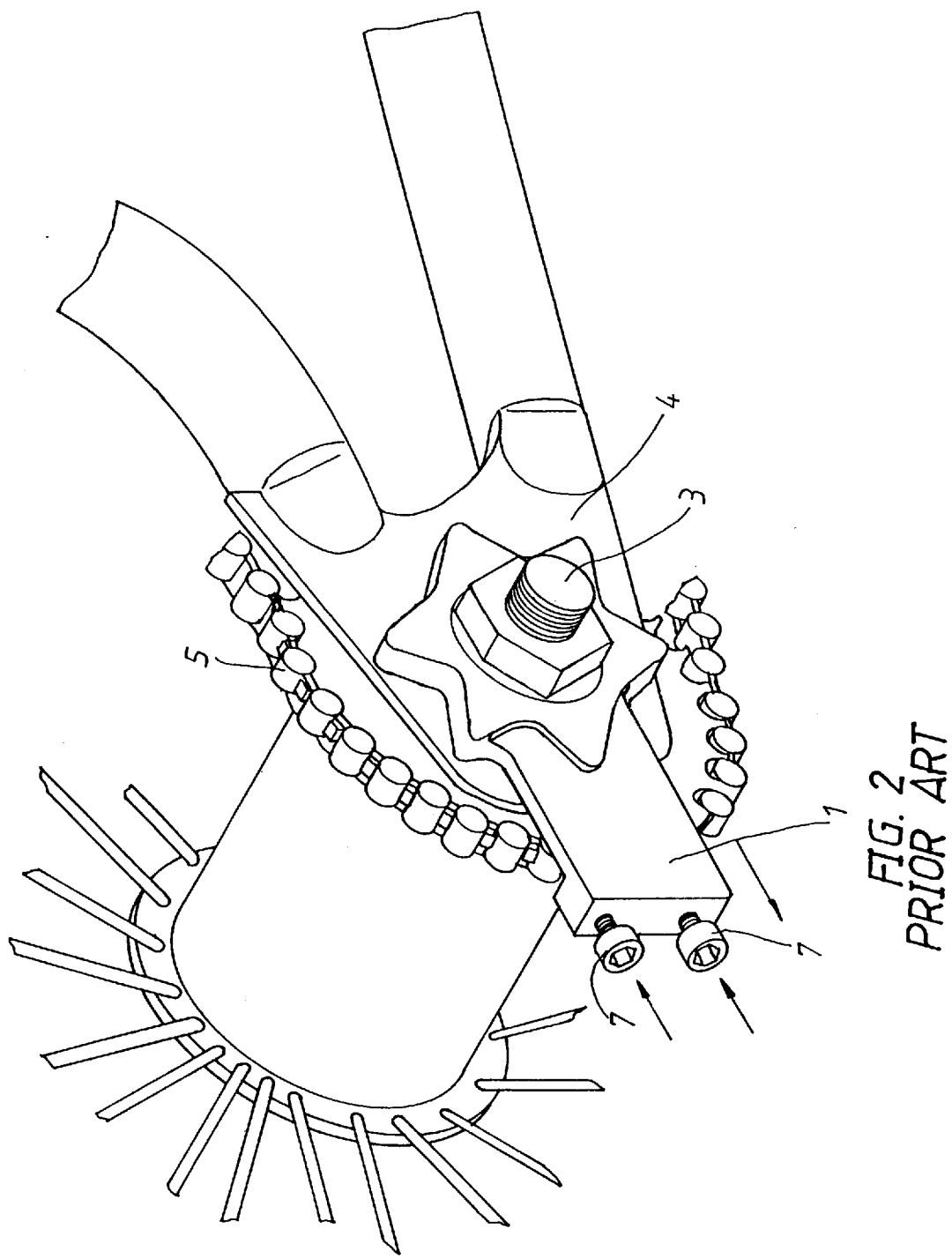
FIG. 2 is a perspective view of the conventional chain adjuster disposed to a rear fork tip of a bicycle.
Figure 3:
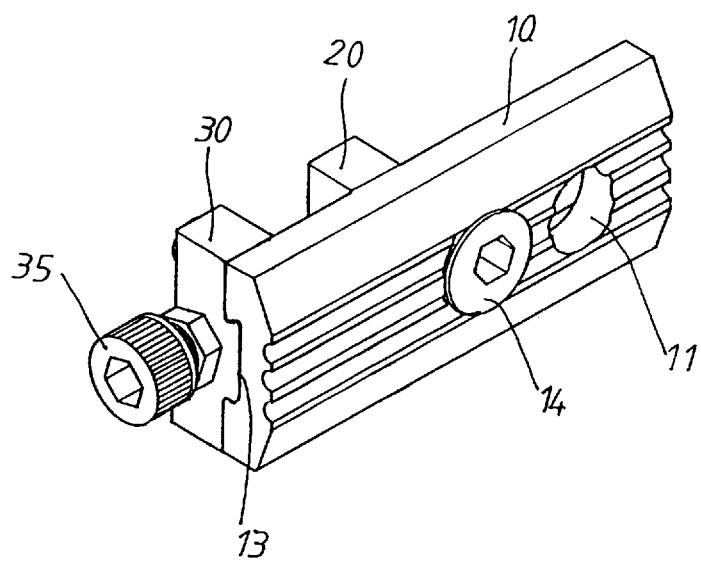
FIG. 3 is a perspective view of a chain adjuster in accordance with the present invention.
Figure 4:
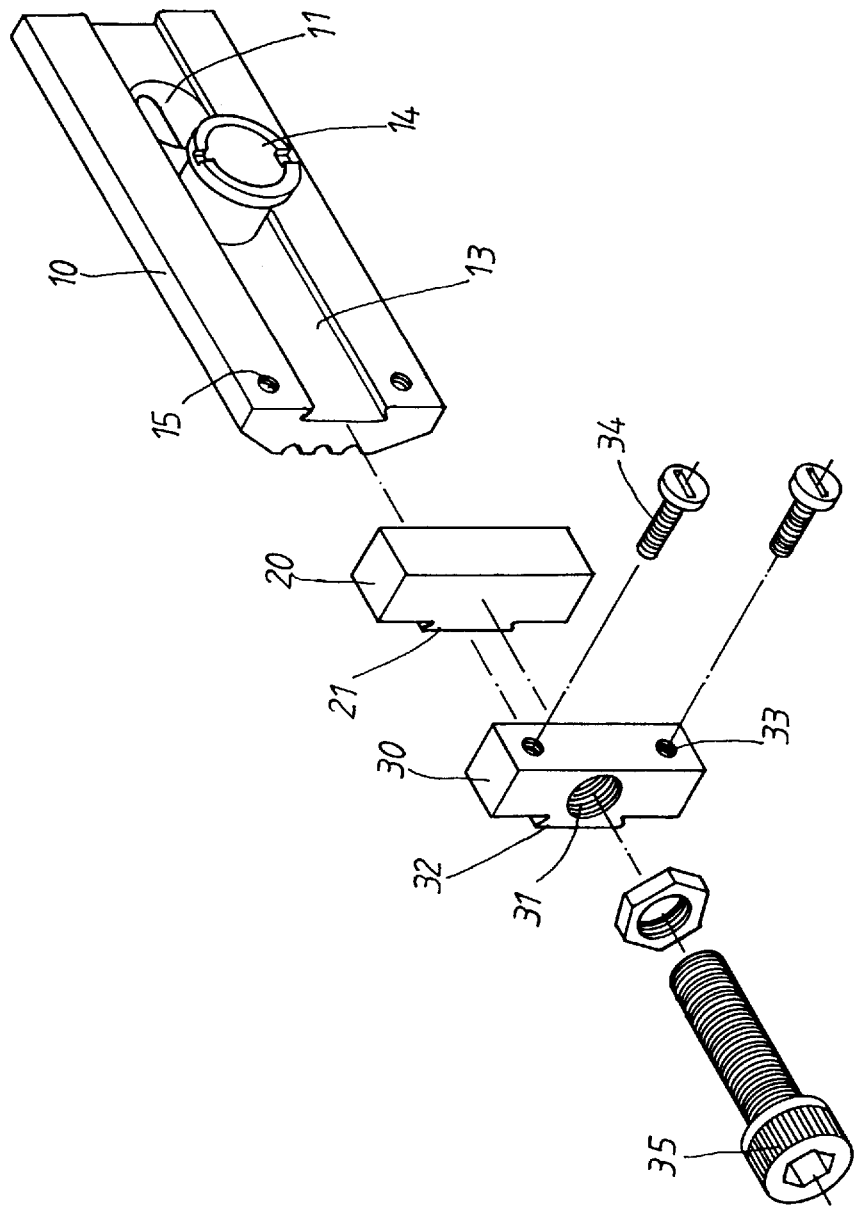
FIG. 4 is an exploded view of the chain adjuster in accordance with the present invention.

Referring to FIGS. 3 and 4, a chain adjuster in accordance with the present invention generally includes a body 10 which is a longitudinal plate having a first side and a second side which has a dovetail groove 13 defined longitudinally therein. A hole 11 defined in the body 10 and a tubular member 14 extending laterally from a bottom defining the dovetail groove 13 of the second side of the body 10. The body 10 further has two first threaded holes 15 defined laterally in one of two ends thereof.

A first block 20 has a first protrusion 21 extending laterally therefrom which has a dovetail outline so that the first protrusion 21 is slidably received in the dovetail groove 13. A second block 30 has a second protrusion 32 with a dovetail outline extends laterally from one of two sides thereof so that the second protrusion 32 is received in the dovetail groove 13 of the body 10. The second block 30 has two third threaded holes 33 defined laterally in the other side thereof so that the second block 30 is fixedly connected to the body 10 by threadedly extending two bolts 34 through the third threaded holes 33 and being received in the first threaded holes 15 of the body 10. The second block 30 has a second threaded hole 31 defined transversely therethrough for an adjusting bolt 35 extending therethrough so as to contact the first block 20.

Figure 5:
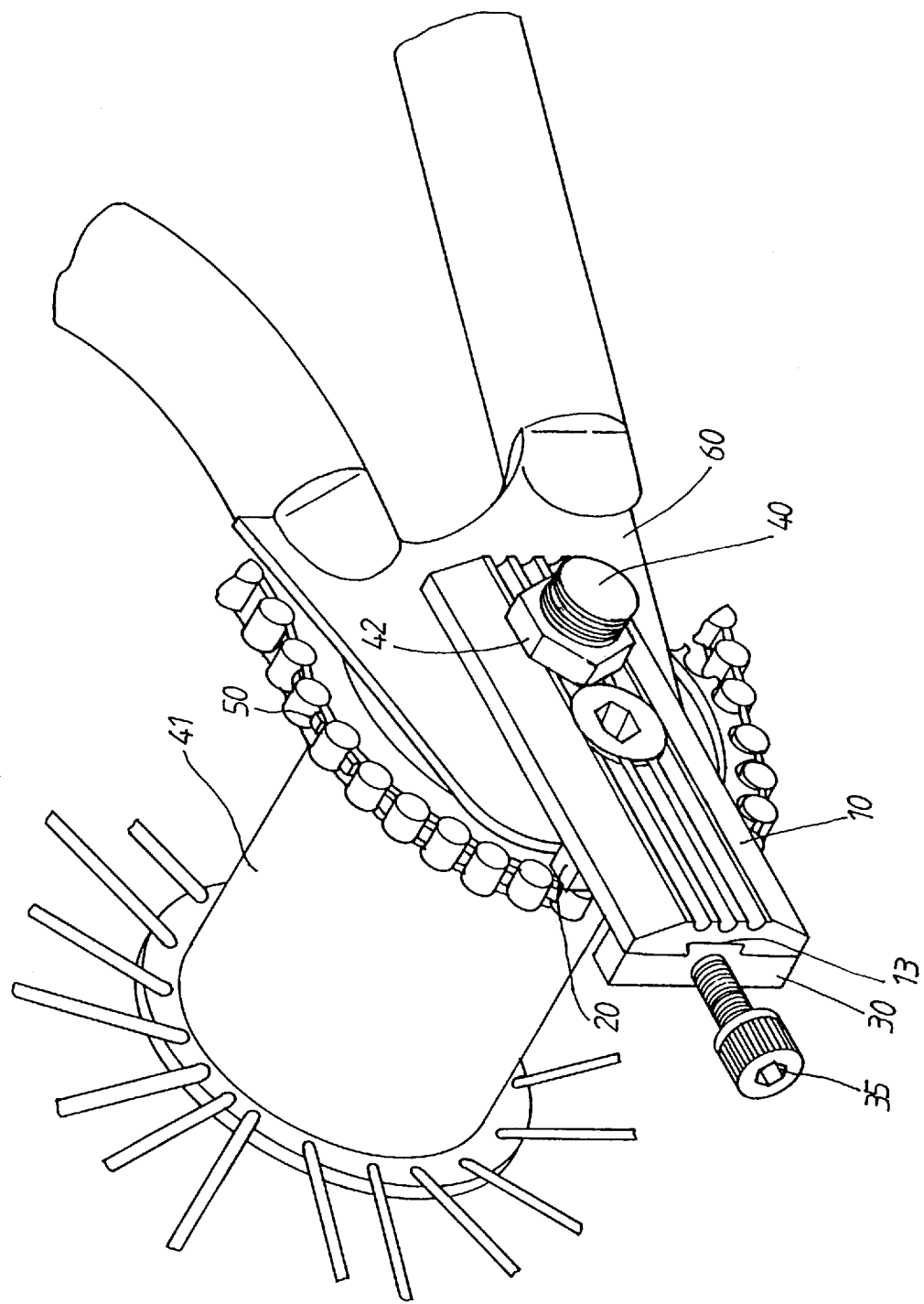
FIG. 5 is a perspective view of the chain adjuster in accordance with the present invention disposed to a rear fork tip of a bicycle.
Figure 6:
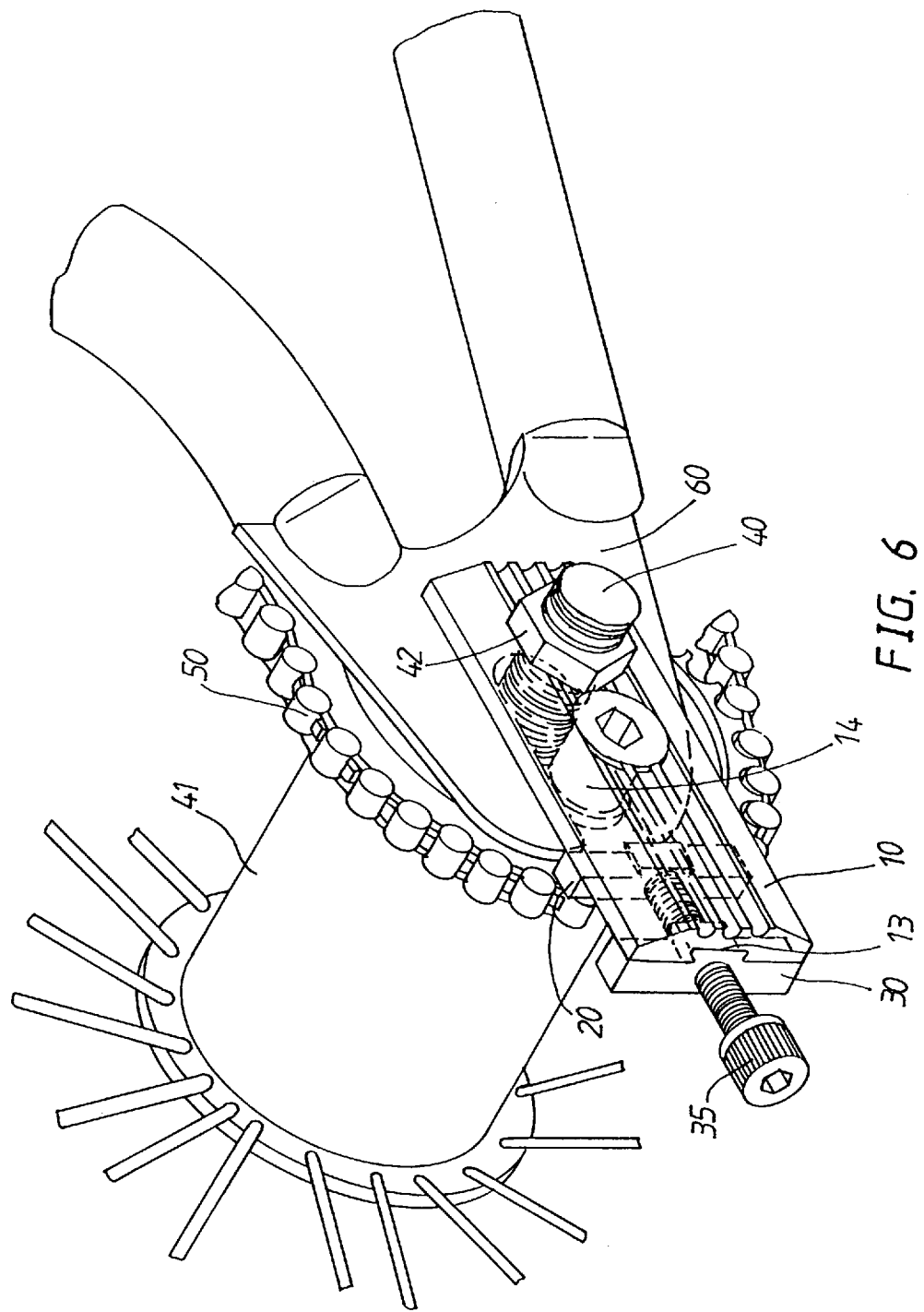
FIG. 6 is an illustrative view to show the adjusting bolt pushing the first block to contact the rear fork tip of the bicycle.

Referring now to FIGS. 5 and 6, an axle 40 of the rear hub 41 extends through a rear fork tip 60 and the hole 11 of the body 10 and is fixedly positioned by a nut 42. The tubular member 14 plays a role to maintain a width of a slot defined in the rear fork tip 60 as known to people in the art. The first block 20 contacts the free end of the rear fork tip 60 and is pushed by the adjusting bolt 35. Therefore, when a chain 50 as shown in FIGS. 5 and 6 is loose, a user (not shown) threads the adjusting bolt 35 to push the first block 20 to slightly move the rear fork tip 60 relative to the axle 40 of the rear hub 41 so as to tighten the chain 50.

Although the invention has been explained in relation to its preferred embodiment, it is to be understood that many other possible modifications and variations can be made without departing from the spirit and scope of the invention as hereinafter claimed.

What is claimed is:

1. A chain adjuster comprising:

a body being a longitudinal plate having a first side and a second side which has a groove defined longitudinally therein, a hole defined in said body and a tubular member extending laterally from said second side of said body, said body having two first threaded holes defined laterally in one of two ends thereof;

a first block having a first protrusion extending laterally therefrom so that said first protrusion is slidably received in said groove;

a second block fixedly connected to said second side of said body and having a second threaded hole defined transversely therethrough, a second protrusion extending laterally from one of two sides of said second block so that said second protrusion is received in said groove of said body, said second block having two third threaded holes defined laterally in the other side thereof so that said second block is fixedly connected to said body by threadedly extending two bolts through said third threaded holes and being received in said first threaded holes, and an adjusting bolt threadedly extending through said second threaded hole and contacting said first block.

2. The chain adjuster as claimed in claim 1 wherein said groove is a dovetail groove.

* * * * *